US008658295B2

(12) United States Patent
Cheng et al.

(10) Patent No.: US 8,658,295 B2
(45) Date of Patent: Feb. 25, 2014

(54) SELF HEALING LITHIUM-ION BATTERY NEGATIVE ELECTRODES, PRODUCT INCLUDING SAME, AND METHODS OF MAKING AND USING SAME

(75) Inventors: Yang T. Cheng, Troy, MI (US); Adam T. Timmons, Southfield, MI (US); Stephen J. Harris, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 13/071,848

(22) Filed: Mar. 25, 2011

(65) Prior Publication Data

US 2012/0244390 A1    Sep. 27, 2012

(51) Int. Cl.
*H01M 4/134*    (2010.01)
*H01M 10/42*    (2006.01)

(52) U.S. Cl.
USPC .................. 429/49; 429/120; 429/231.95

(58) Field of Classification Search
USPC .................. 429/49, 112, 120, 231.95
See application file for complete search history.

(56) References Cited

U.S. PATENT DOCUMENTS

| | | | |
|---|---|---|---|
| 4,886,715 A * | 12/1989 | McCullough et al. | 429/112 X |
| 6,051,340 A * | 4/2000 | Kawakami et al. | 429/231.95 |
| 7,122,279 B2 * | 10/2006 | Tamura et al. | 429/231.95 |
| 7,563,541 B2 * | 7/2009 | Howard et al. | 429/231.95 X |
| 2008/0241660 A1 * | 10/2008 | Ogawa et al. | 429/122 |

* cited by examiner

*Primary Examiner* — Stephen J. Kalafut
(74) *Attorney, Agent, or Firm* — BrooksGroup

(57) ABSTRACT

One embodiment includes a lithium-ion battery negative electrode including one or more low-melting point alloys that react with lithium.

19 Claims, 4 Drawing Sheets

SELF HEALING LITHIUM-ION BATTERY NEGATIVE ELECTRODES, PRODUCT INCLUDING SAME, AND METHODS OF MAKING AND USING SAME

TECHNICAL FIELD

The field to which the disclosure relates includes lithium-ion battery negative electrodes, including such electrodes and methods for making and using the same.

BACKGROUND

Lithium-ion batteries are a type of rechargeable battery in which a lithium-ion moves between a negative electrode and a positive electrode. Lithium-ion batteries are commonly used in consumer electronics. In addition to uses for consumer electronics, lithium-ion batteries are growing in popularity for defense, automotive, and aerospace applications because of their high energy density.

The process of lithium-ion insertion and extraction can result in large volume expansion and contraction in some high capacity negative electrodes. This expansion and contraction can approach three hundred percent, which may make the positive and negative electrodes prone to cracking as the battery cycles between charging and discharging.

SUMMARY OF EXEMPLARY EMBODIMENTS OF THE INVENTION

One exemplary embodiment includes product having a positive electrode and a negative electrode made of low-melting point alloy having a melting point below about 150 degrees Celsius that reacts with lithium. By periodically heating the negative electrodes close to their melting points, any cracks associated with lithium-ion insertion and extraction during normal usage of the product may be repaired.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment includes a negative electrode which may be formed of material that reacts with a relatively large amount of lithium. Moreover, the composition of the material that reacts with a relatively large amount of lithium is such that it may be subsequently repaired by heating the negative electrodes to a temperature near the materials respective melting points, wherein the cracks may be substantially "healed" or otherwise repaired. This may result in a longer cycle life negative electrode.

Given the need for heating to repair the negative electrodes, it is also desirable that the materials that react with lithium forming the negative electrode have a relatively low melting point to prevent degradation of the battery or electrode assembly in which the electrode may be used as a result of the afore-mentioned heating. In one exemplary embodiment, the melting point should be above the operating temperature for the battery system in which it is utilized, but below about 80 degrees Celsius unless the cell utilizes a non-conventional electrolyte (i.e. one that is not composed of organic ester acid solvent constituents that thermally decompose on the negative electrode at temperatures above about 80 degrees Celsius).

Figure 1:
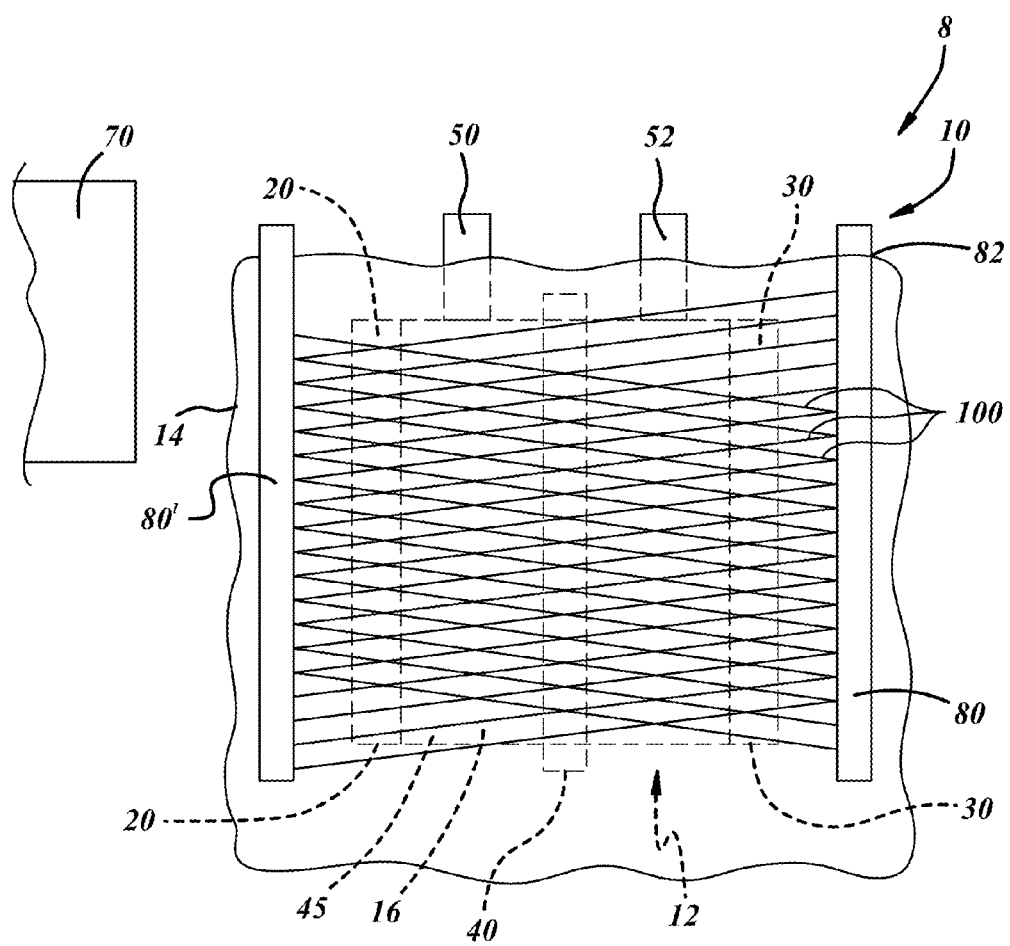
FIG. 1 is a schematic illustration of a cell enclosure-type lithium-ion battery including a negative electrode according to an exemplary embodiment.

One exemplary embodiment for the use of a negative electrode in a product 8 may be described in FIG. 1, which illustrates a top plan view of a lithium-ion battery 10 that may be used in automotive applications having an electrode assembly 12 and a cell enclosure 14, which may be formed with an interior region 16 for receiving the electrode assembly 12. In other words, FIG. 1 illustrates a cell enclosure prismatic lithium-ion battery 10 having the afore-mentioned electrode assembly 12. The components of the electrode assembly 12 and cell enclosure 14 are illustrative of the basic components and not intended to be depicted in proper orientation or scale.

The electrode assembly 12 may include a first electrode layer 20, a second electrode layer 30, and a separator 40 (or solid electrolyte layer (not shown)) arranged between the first and second electrode layers 20 and 30 to prevent a short circuit between the first and second electrode layers 20 and 30 and allowing only lithium-ions to pass through it. The electrode assembly 12 may be formed by winding the first electrode layer 20, the separator layer 40 (or solid electrolyte layer), and the second electrode layer 30 into a jelly roll type structure. Alternatively, the first electrode layer 20, the separator 40 (or solid electrolyte layer), and the second electrode layer 30 may be sequentially positioned into a stack structure (not shown) or the first electrode layer 20, the separator 40 (or solid electrolyte layer) and the second electrode layer 30 may be coiled into a roll (not shown). Moreover, as shown in FIG. 1, the first electrode layer 20 is a positive electrode 20 while the second electrode layer 30 is a negative electrode 30 although the reverse arrangement is contemplated. A liquid electrolyte 45 may be introduced within the interior region 16 of the cell enclosure 14 prior to the cell enclosure 14 being sealed.

A positive tab 50 and a negative tab 52 may be electrically connected to the respective electrode 20, 30 of the electrode assembly 10 may be installed such that a predetermined length of them may be exposed outside the case cell enclosure 14. Portions of the electrode tabs 50 and 52 that come in contact with the case cell enclosure 14 may be wrapped with an insulating tape (not shown).

The positive electrode 20 may be formed by coating a strip shaped metal layer such as a positive collector with a coating including a positive active material present on the positive collector such as, but not limited to, $LiFePO_4$ or $LiMnO_2$ or another positive electrode active material as a main component. The coating can also include a binder and a conductive material. The positive electrode 20 may be electrically connected to the positive tab 50 and wrapped with insulating tape (not shown).

In one embodiment, the separator 40 may be made of a polyethylene film, a polypropylene film, or a combination thereof. The separator 40 may be formed to be wider than the positive and negative layers 20 and 30 to prevent a short circuit between the positive and negative layers 20 and 30.

In one embodiment, the liquid electrolyte 45 may include solid lithium salt electrolytes such as, but not limited to, $LiPF_6$, $LiBF_4$, or $LiClO_4$, and organic solvents such as carbonate. The liquid electrolyte 45 conducts lithium-ions, which acts as a carrier between the negative electrode 30 and the positive electrode 20 when the battery 10 passes an electric current through an external circuit.

The cell enclosure 14 may be formed from a wide variety of materials that are both flexible and heat sealable such that no oxygen or water vapor may enter. The cell enclosure 14 may be a laminate material consisting of aluminum and plastic.

Both the active material in the positive electrode 20 and the active material in the negative electrode 30 are materials into which and from which lithium can migrate. When a cell is discharging, the lithium leaves the negative electrode 30 and reacts with the positive electrode 20. When the cell is charging, the reverse process occurs: lithium is extracted from the positive electrode 20 and forced to react with the negative electrode 30.

The negative electrode 30, in accordance with one exemplary embodiment, may be formed by coating a strip shaped metal layer such as a negative collector with a negative active material in the form of particles or thin films of alloys of Tin, Bismuth and Indium as will be described further below. The negative electrode 30 may be electrically connected to a negative tab 52 and wrapped with insulating tape (not shown). In one exemplary embodiment, the strip shaped metal layer is formed from copper, and could alternatively be formed from nickel.

The process of lithium insertion and extraction results in a large volume expansion and contraction of the negative electrode composed of metals or metal alloys that react with lithium 30. This expansion and contraction of metals and metal alloys upon Li insertion and removal can be as large as several hundred percent, which may make the negative electrode materials 30 prone to cracking as the battery cycles between charging and discharging.

In order to substantially repair these cracks, in accordance with the exemplary embodiments herein, heat may be directed to the negative electrode 30 at a temperature near the alloy's melting point. At this temperature, the cracks formed previously by volume expansion and contraction may be substantially "healed" or "repaired" by softening the negative electrodes.

To accomplish this, in accordance with one exemplary embodiment as also shown in FIG. 1, heat from the closely coupled engine block 70 may be utilized in products 8 such as the lithium-ion battery 10 where the negative electrode 30 is formed from an alloy having a sufficiently low melting point. Although an engine block 70 is shown in FIG. 1, the battery 10 including the self healing negative electrodes 30 may be used in fuel cell-type hybrid vehicles or electric vehicles.

In accordance with another exemplary embodiment (also shown in FIG. 1), a pair of spaced apart electric buses 80, with resistive heating wires 100 therebetween. In one exemplary embodiment, the buses 80, 80' may extend through a hole 82 in the cell enclosure 14. In these exemplary embodiments, the wires 100 may or may not be in direct contact with the negative electrode 30, Current flowing through the wires 100 may heat the negative electrode 30 to a temperature near the alloy's melting point in order to remelt the alloy and repair the cracks formed therein. The current is then discontinued, thus allowing the negative electrode 30 to cool below its melting point, wherein the negative electrode 30 is once again available for use.

Elements that have been identified as having the ability to react with a relatively large amount of lithium and are potentially available for use in negative electrode 30 include Tin (Sn), Bismuth (Bi), and Indium (In). However, each of these elements alone has relatively high melting points of above 150 degrees Celsius. By properly alloying elemental Tin, Bismuth, and Indium, the melting point of the alloy can be lowered to below 150 degrees Celsius and possibly below 100 degrees Celsius. This in turn allows the cracks formed in the negative electrode 30 during normal usage cycles to be healed by raising the temperature of the negative electrode 30 to a temperature near its melting point of about 100 degrees Celsius while remaining below 80 degrees Celsius.

In one specific exemplary embodiment, the negative electrode 30 may be formed of low melting point alloys that react with lithium of M—Sn, where M is a metal selected from Bi and In, or both Bi and In, that is alloyed with Sn. A low melting point alloy that reacts with lithium, for the purposes herein, may be a material that is solid at battery operating temperatures but has a melting point below a predetermined maximum temperature, here at a maximum of about 150 degrees Celsius or more preferably below 100 degrees Celsius or lower.

Figure 2A:
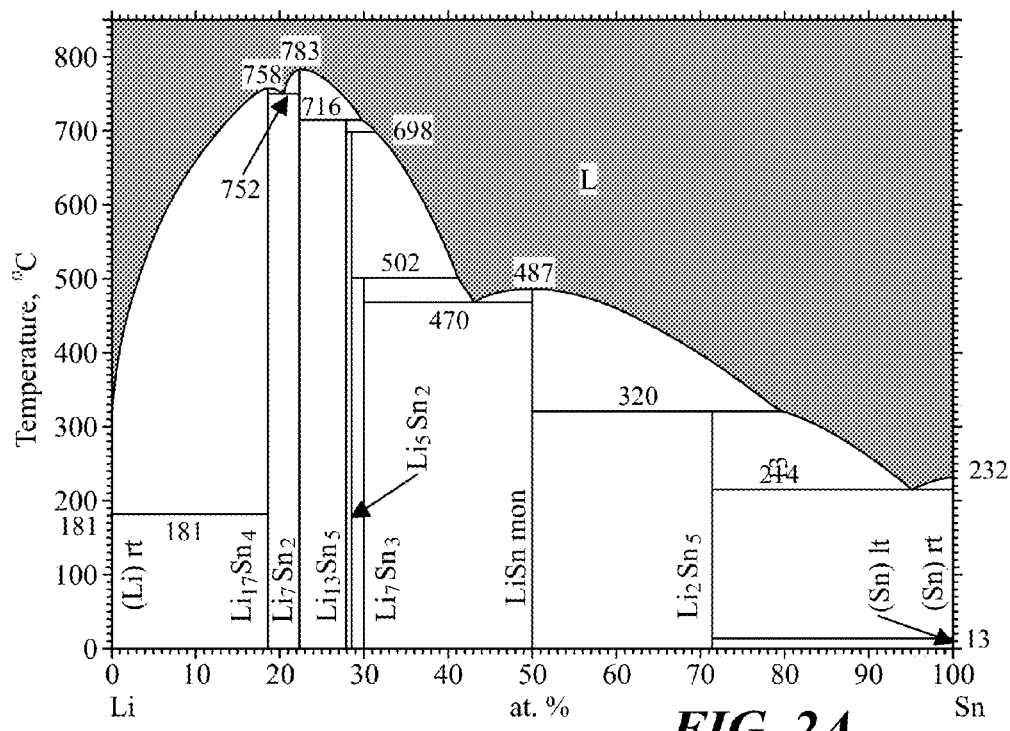
FIG. 2A is a binary phase diagram of a Li—Sn system.
Figure 2B:
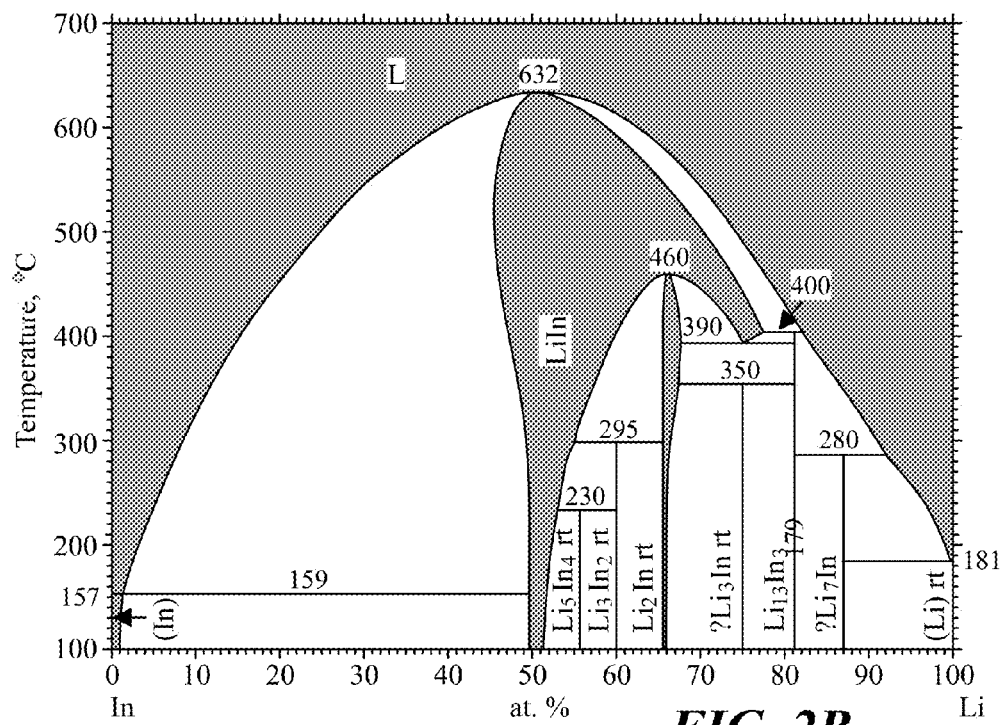
FIG. 2B is a binary phase diagram of a Li—In system.
Figure 2C:
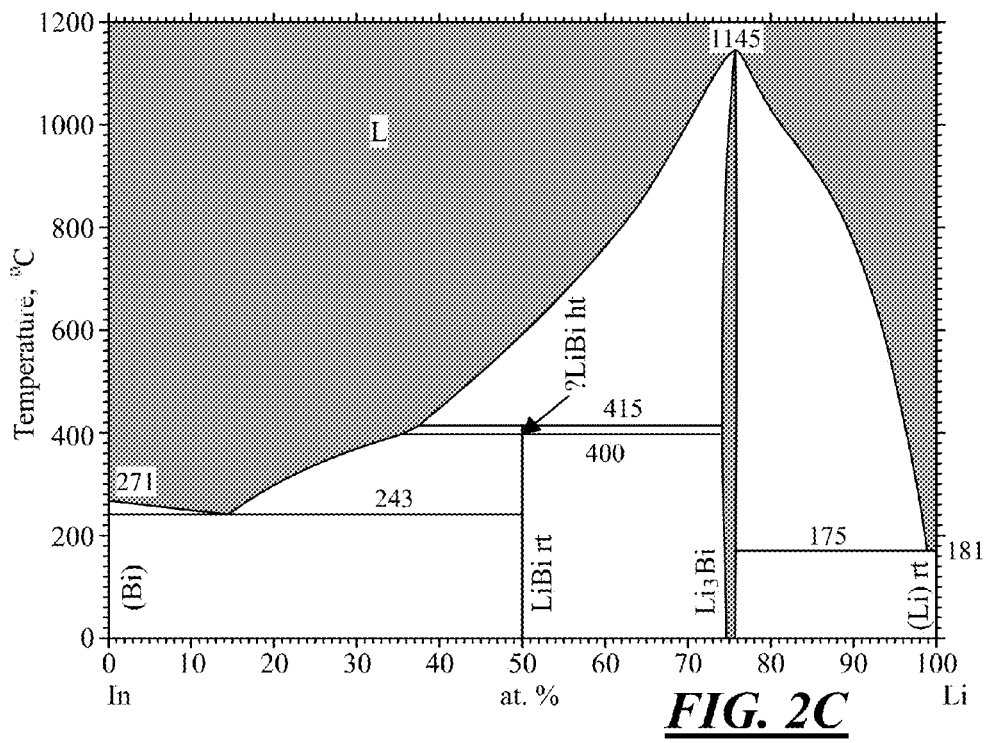
FIG. 2C is a binary phase diagram of a Li—Bi system.
Figure 3A:
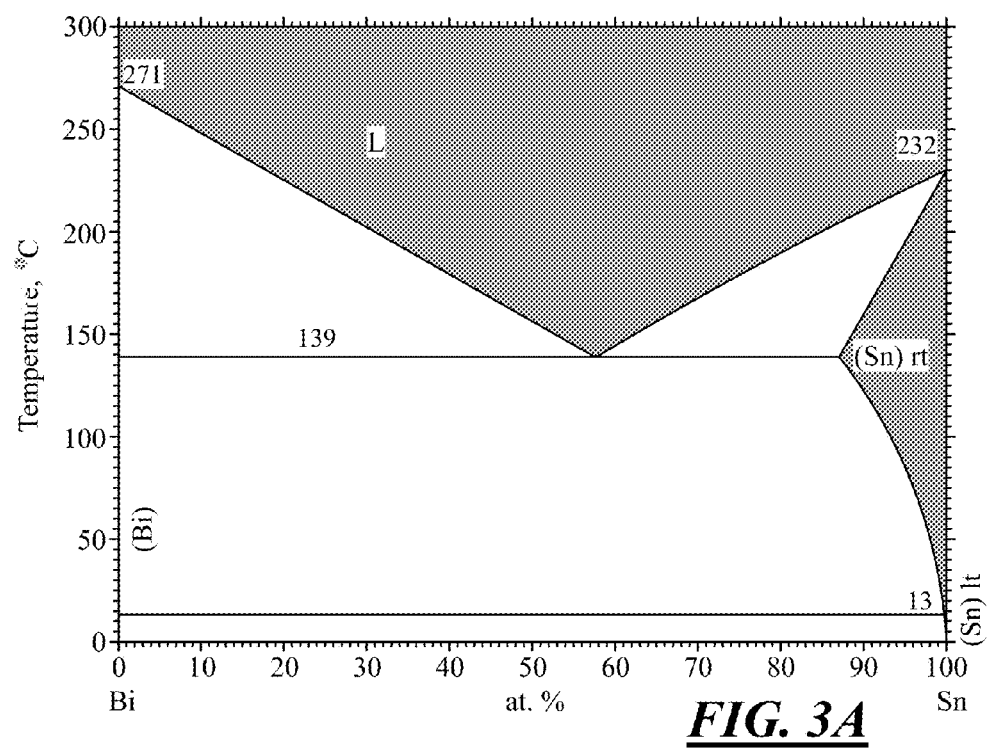
FIG. 3A is a binary phase diagram of a Bi—Sn system.
Figure 3B:
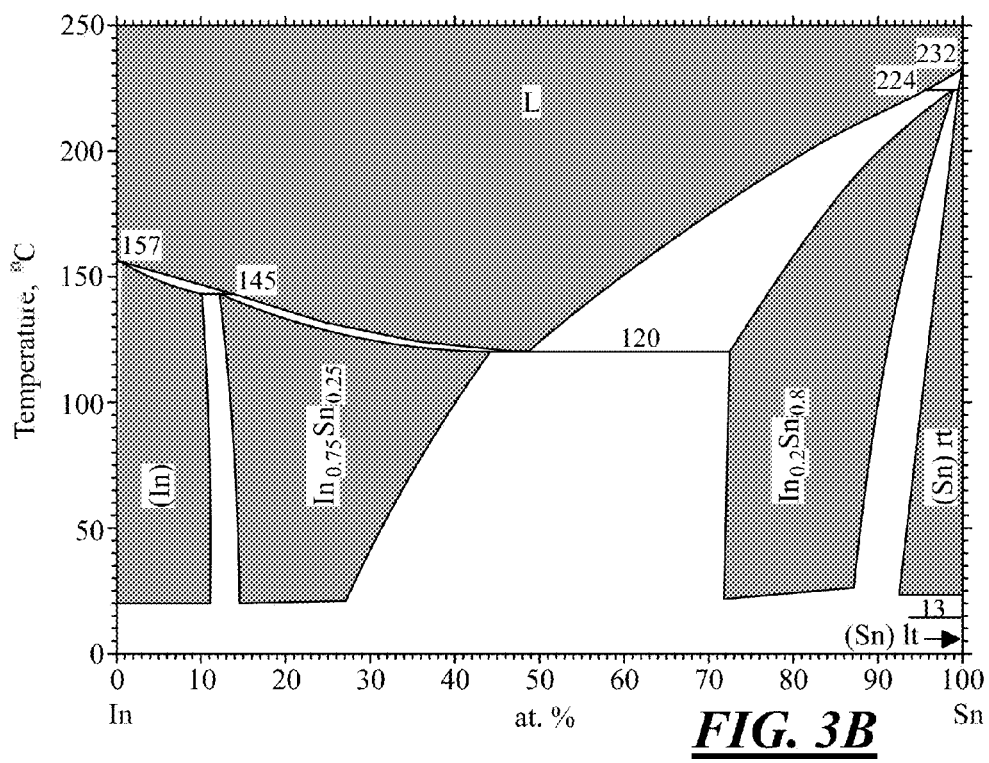
FIG. 3B is a binary phase diagram of a In—Sn system.
Figure 4:
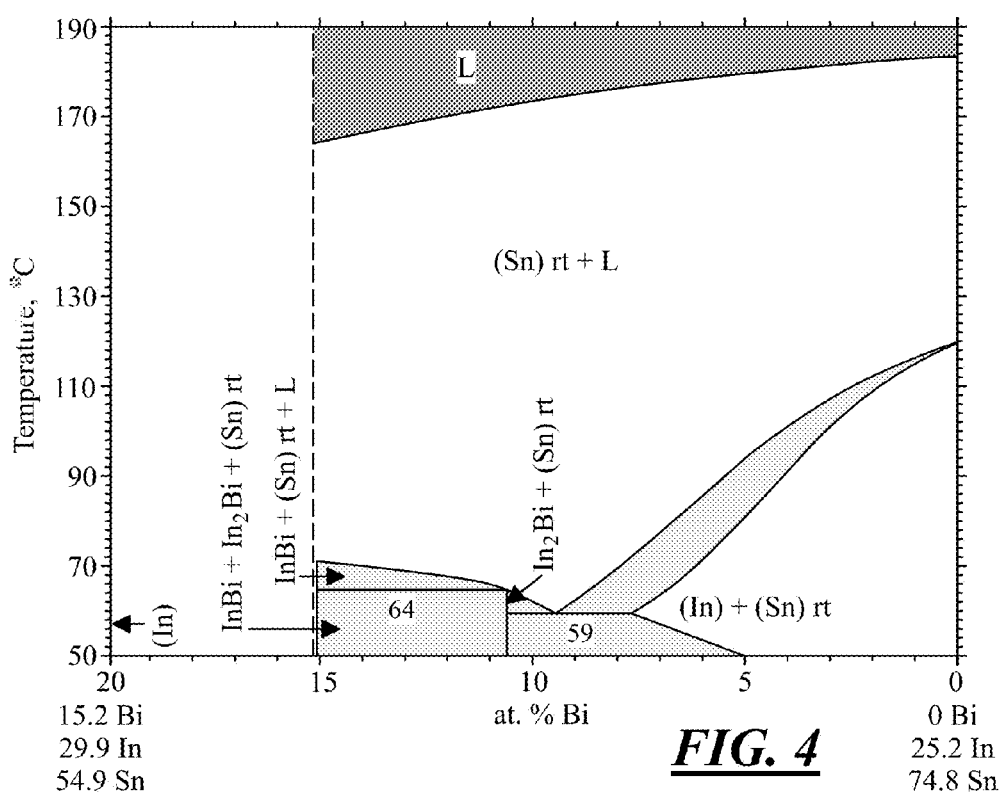
FIG. 4 is a pseudo-binary phase diagram of a Sn—In—Bi system.

FIGS. 2A, 2B and 2C illustrate binary phase diagrams for a Li—Sn alloy system, a Li—In alloy system, and a Li—Bi alloy system. FIGS. 3A and 3B illustrate binary phase diagrams for a Bi—Sn alloy system and an In—Sn alloy system. Finally, FIG. 4 illustrates a pseudo binary-phase diagram for a Bi—Sn—In alloy system.

As FIGS. 2A, 2B and 2C illustrate, none of the proposed alloys of Li—Sn, Li—In or Li—Bi achieves melting or eutectic points of below 150 degrees Celsius. A eutectic or eutectic mixture, for the purposes herein, is defined as a mixture of two or more metals at such proportions that the melting point is as low as possible, and that furthermore all the constituents crystallize simultaneously at this temperature from molten liquid solution. Such a simultaneous crystallization of a eutectic mixture is known as a eutectic reaction, the temperature at which it takes place is the eutectic temperature, and the composition and temperature at which this takes place is the eutectic point.

As FIG. 3A illustrates, however, a eutectic point at 139 degrees Celsius may be achieved for an alloy comprising roughly 57% Bi and 43% Sn (by atomic percent). Moreover, as FIG. 3B illustrates, a eutectic point at 120 degrees Celsius may be achieved for an alloy comprising roughly 49% In and 51% Sn (by atomic percent). In addition, as FIG. 4 illustrates, a eutectic point at 59 degrees Celsius may be achieved for an alloy comprising roughly 9.5% Bi in an alloy consisting of Sn, In, and Bi. In addition, each of these diagrams confirms melting points of various alloys below about 150 degrees Celsius. FIGS. 3A, 3B and 4 thus indicate that various alloys of an Sn—In—Bi system may be available for use as a negative electrode 30 in products 8 such as lithium-ion battery systems 10 as described herein desiring a negative electrode 30 having the ability to react with a relatively large amount of lithium and a relatively low melting point of well below about 150 degrees Celsius, such that the negative electrode may be "healed" or repaired as described above.

One specific exemplary composition of a negative electrode 30 that may be derived from FIG. 3A is an alloy composition of approximately 42 atomic percent Bi and 58 atomic percent Sn. In addition, one specific exemplary composition of a negative electrode 30 that may be derived from FIG. 3B is an alloy composition of approximately 50 atomic percent In and 50 atomic percent Sn. Also, one specific exemplary composition of a negative electrode that may be derived from FIG. 4 is an alloy composition of approximately 9 atomic percent Bi, approximately 64 atomic percent Sn, and approximately 27 atomic percent In.

While one specific exemplary embodiment discloses the use of the negative electrode 30 in a cell enclosure type lithium-ion battery system 10, such a product 8 should be deemed as non-limiting. The negative electrodes formed from the low melting point alloys that react with lithium may find use in any other type of conventional lithium-ion battery system.

The above description of embodiments of the invention is merely exemplary in nature and, thus, variations thereof are not to be regarded as a departure from the spirit and scope of the invention.

What is claimed is:

1. A product comprising:
   a positive electrode;
   a negative electrode comprising an alloy that reacts with lithium, said alloy having a melting point below about 150 degrees Celsius and comprising at least two metals, at least one of which being a metal that can react with lithium, wherein said melting point is above an operating temperature for said negative electrode the negative electrode being constructed and arranged to self-heal by periodically warming to a temperature near said melting point to substantially remove any cracks in said negative electrode.

2. The product of claim 1, wherein said alloy comprises Sn alloyed to at least one of Bi or In.

3. The product of claim 2, wherein said alloy comprises an alloy composition of approximately 42 atomic percent Bi and 58 atomic percent Sn.

4. The product of claim 2, wherein said alloy comprises approximately 50 atomic percent In and 50 atomic percent Sn.

5. The product of claim 2, wherein alloy comprises approximately 9 atomic percent Bi, approximately 64 atomic percent Sn, and approximately 27 atomic percent In.

6. The product of claim 1 further comprising:
   a separator coupled between said positive electrode and said negative electrode to form an electrode assembly.

7. A method comprising:
   providing a lithium-ion battery system comprising a negative electrode comprising an alloy that reacts with lithium composition, wherein said alloy has a melting point below about 150 degrees Celsius and above a normal operating temperature of said lithium-ion battery system;
   heating said negative electrode for a sufficient period of time to substantially remove any cracks in said negative electrode; and
   cooling said negative electrode.

8. The method of claim 7, wherein said alloy comprises Sn alloyed to at least one of Bi and In.

9. The method of claim 7, wherein heating said negative electrode comprises:
   heating said negative electrode outside of the battery system to a temperature near or slightly above said melting point for a sufficient period of time to substantially remove any cracks in said negative electrode.

10. The method of claim 7, wherein heating said negative electrode comprises:
    heating said negative electrode inside the battery system to a temperature near or slightly above said melting point for a sufficient period of time to substantially remove any cracks in said negative electrode.

11. The method of claim 7, wherein the heating said negative electrode and cooling said negative electrode comprises:
    introducing a current through said negative electrode to raise a temperature of said negative electrode near or above said melting point for a sufficient period of time to substantially remove any cracks in said negative electrode; and
    removing said current from said negative electrode.

12. A method for increasing the cycle life of a cell enclosure-type lithium-ion battery system used in a product, the method comprising:
    providing the cell enclosure-type lithium-ion battery system including at least one negative electrode and at least one positive electrode, wherein said at least one negative electrode comprises an alloy, wherein said alloy has a melting point below about 150 degrees Celsius and above a normal operating temperature of the cell enclosure-type lithium-ion battery system;
    periodically warming said at least one negative electrode to a temperature near said melting point for a period of time sufficient to substantially remove any cracks in said at least one negative electrode; and
    cooling said at least one negative electrode to a temperature below said melting point.

13. The method of claim 12, wherein periodically warming said at least one negative electrode comprises:
    heating said at least one negative electrode outside of the battery system from said normal operating temperature to a temperature near said melting point for a sufficient period of time to melt said at least one negative electrode to substantially repair said cracks in said negative electrode.

14. The method of claim 12, wherein periodically warming said at least one negative electrode comprises:
    coupling an electric bus to said at least one negative electrode; and
    introducing an electrical current from said electric bus through said at least one negative electrode;
    maintaining said electrical current for a period of time sufficient to substantially heal any cracks in said negative electrode; and
    uncoupling said electric bus from said at least one negative electrode.

15. The method of claim 12, further comprising:
    determining one or more alloys of at least two metals, at least one of which having the ability to react with lithium, having a melting point below about 150 degrees Celsius;
    determining which of said one or more alloys has a desired blend of lithium-ion absorbing capabilities and low melting point at a particular size and shape for use as a negative electrode in the product;
    forming a negative electrode having said determined alloy content; and
    introducing at least one of said negative electrodes within an interior portion of the battery system.

16. The method of claim 15, wherein said at least two lithium-absorbing metals comprises Sn alloyed to at least one of Bi or In.

17. The method of claim 15, wherein said at least two lithium-absorbing metals comprises approximately 42 atomic percent Bi and 58 atomic percent Sn.

18. The method of claim 15, wherein said at least two lithium-absorbing metals comprises approximately 50 atomic percent In and 50 atomic percent Sn.

19. The method of claim 15, wherein said at least two lithium-absorbing metals comprises approximately 9 atomic percent Bi, approximately 64 atomic percent Sn, and approximately 27 atomic percent In.

* * * * *